(12) United States Patent
Echigo et al.

(10) Patent No.: US 10,347,929 B2
(45) Date of Patent: Jul. 9, 2019

(54) ELECTROCHEMICAL ELEMENT, SOLID OXIDE FUEL CELL, AND METHODS FOR PRODUCING THE SAME

(71) Applicants: Osaka Gas Co., Ltd., Osaka-shi (JP); National Institute of Advanced Industrial Science and Technology, Tokyo (JP)

(72) Inventors: Mitsuaki Echigo, Osaka (JP); Hisao Ohnishi, Osaka (JP); Kyohei Manabe, Osaka (JP); Osamu Yamazaki, Osaka (JP); Kazuyuki Minami, Osaka (JP); Jun Akedo, Tsukuba (JP); Toshio Suzuki, Nagoya (JP)

(73) Assignees: Osaka Gas Co., Ltd., Osaka (JP); National Institute of Advanced Industrial Science and Technology, Tokyo (JP)

( * ) Notice: Subject to any disclaimer, the term of this patent is extended or adjusted under 35 U.S.C. 154(b) by 87 days.

(21) Appl. No.: 15/511,789

(22) PCT Filed: Sep. 18, 2015

(86) PCT No.: PCT/JP2015/076701
§ 371 (c)(1),
(2) Date: Mar. 16, 2017

(87) PCT Pub. No.: WO2016/043315
PCT Pub. Date: Mar. 24, 2016

(65) Prior Publication Data
US 2017/0301941 A1    Oct. 19, 2017

(30) Foreign Application Priority Data
Sep. 19, 2014    (JP) .................... 2014-192027

(51) Int. Cl.
*H01M 8/1226* (2016.01)
*H01M 8/12* (2016.01)
(Continued)

(52) U.S. Cl.
CPC ........... *H01M 8/1226* (2013.01); *C23C 24/04* (2013.01); *H01M 4/86* (2013.01); *H01M 4/8605* (2013.01);
(Continued)

(58) Field of Classification Search
None
See application file for complete search history.

(56) References Cited

U.S. PATENT DOCUMENTS

2004/0058228 A1* 3/2004 Shibata ................ H01M 4/861
                                                                    429/480
2005/0026017 A1* 2/2005 Seabaugh ............. B82Y 30/00
                                                                    252/62.2
2005/0221153 A1   10/2005 Sugimoto et al.

FOREIGN PATENT DOCUMENTS

JP    2003208901 A    7/2003
JP    2004207088 A    7/2004
(Continued)

OTHER PUBLICATIONS

Choi et al., "Electrochemical effects of cobalt doping on (La,Sr)(Ga,Mg)O3-δ electrolyte prepared by aerosol deposition," International Journal of Hydrogen Energy, 2012, pp. 6830-6835, vol. 37, No. 8.

*Primary Examiner* — Alix E Eggerding
(74) *Attorney, Agent, or Firm* — The Webb Law Firm (57) ABSTRACT

Realized are a high-performance electrochemical element and solid oxide fuel cell in which the contact properties between a dense and highly-gastight electrolyte layer and an electrode layer are improved while the treatment temperature during formation of the electrolyte layer is suppressed (Continued)

to a low temperature, and methods for producing the same. An electrochemical element includes an electrode layer 3, and an electrolyte layer 4 arranged on the electrode layer 3, wherein the electrode layer 3 has a plurality of pores that are open on a face thereof in contact with the electrolyte layer 4, and the pores are filled with fine particles made of the same components as the electrolyte layer 4.

15 Claims, 3 Drawing Sheets

(51) Int. Cl.
*H01M 4/86* (2006.01)
*H01M 8/02* (2016.01)
*H01M 4/90* (2006.01)
*H01M 8/1253* (2016.01)
*C23C 24/04* (2006.01)
*H01M 8/0232* (2016.01)
*H01M 8/124* (2016.01)

(52) U.S. Cl.
CPC ........... *H01M 4/9066* (2013.01); *H01M 8/02* (2013.01); *H01M 8/0232* (2013.01); *H01M 8/12* (2013.01); *H01M 8/1253* (2013.01); *H01M 2008/1293* (2013.01)

(56) References Cited

FOREIGN PATENT DOCUMENTS

| | | | |
|---|---|---|---|
| JP | 2006-222006 | * | 2/2005 |
| JP | 2006222006 | A | 8/2006 |
| JP | 2008234927 | A | 10/2008 |
| JP | 2008257885 | A | 10/2008 |
| JP | 2010121203 | A | 6/2010 |

* cited by examiner

ELECTROCHEMICAL ELEMENT, SOLID OXIDE FUEL CELL, AND METHODS FOR PRODUCING THE SAME

CROSS-REFERENCE TO RELATED APPLICATIONS

This application is the United States national phase of International Application No. PCT/JP2015/076701 filed Sep. 18, 2015, and claims priority to Japanese Patent Application No. 2014-192027 filed Sep. 19, 2014, the disclosures of which are hereby incorporated in their entirety by reference.

TECHNICAL FIELD

The present invention relates to an electrochemical element having a metal substrate, an electrode layer, and an electrolyte layer, a solid oxide fuel cell, and methods for producing the same.

BACKGROUND ART

In conventional electrolyte-supported solid oxide fuel cell stacks (hereinafter, referred to as "SOFCs") and electrode-supported SOFCs, sintering at a high temperature (e.g., 1400° C.) is performed in order to obtain a dense and highly-gastight electrolyte layer. In recent years, metal-supported SOFCs in which a fuel electrode, an air electrode, and an electrolyte layer are supported on a metal plate have been developed in order to reduce the thickness and to improve the robustness.

Patent Document 1 discloses a metal-supported SOFC in which a fuel electrode, an electrolyte layer, and an air electrode in the shape of thin films are layered in this order on a porous metal substrate. In the production process of this SOFC, after an electrolyte material is applied to and dried on a fuel electrode, pressing treatment is performed. Subsequently, sintering is performed to form a dense electrolyte layer.

PRIOR ART DOCUMENTS

Patent Documents

Patent Document 1: JP 2008-234927A

DISCLOSURE OF THE INVENTION

Problem to be Solved by the Invention

If heat treatment is performed at a high temperature during production of a metal-supported SOFC, a metal substrate that functions as a support may deteriorate, and diffusion of elements such as Cr from the metal substrate may adversely affect constituent elements (an electrode layer and an electrolyte layer) of the SOFC, and thus the durability of the SOFC may decrease. Accordingly, heat treatment at a low temperature is desirable. On the other hand, if the heat treatment temperature during production is lowered, it becomes difficult to obtain a good electrode layer and electrolyte layer. For example, if the sintering temperature of the electrolyte layer is lowered, the contact properties between the electrolyte layer and the electrode layer decrease, and thus polarization resistance may increase.

Note that the above-described SOFCs, solid oxide electrolysis cells (hereinafter, referred to as "SOECs") in which hydrogen is produced from water through electrolysis, oxygen sensors that use solid oxides, and the like have the same basic structure. That is to say, an electrochemical element having a metal substrate, an electrode layer, and an electrolyte layer is used in SOFCs, SOECs, oxygen sensors, and the like. The above-described problems are common to these electrochemical elements, SOFCs, SOECs, oxygen sensors, and the like.

The present invention was arrived at in view of the above-described problems, and it is an object thereof to realize a high-performance electrochemical element and solid oxide fuel cell in which the contact properties between a dense and highly-gastight electrolyte layer and an electrode layer are improved while the treatment temperature during formation of the electrolyte layer is suppressed to a low temperature, and methods for producing the same.

Means for Solving Problem

In order to achieve the above-described object, the present invention is directed to an electrochemical element including: an electrode layer; and an electrolyte layer arranged on the electrode layer, wherein the electrode layer has a plurality of pores that are open on a face thereof in contact with the electrolyte layer, and the pores are filled with fine particles made of the same components as the electrolyte layer.

With this characteristic configuration, the plurality of pores that are open on a face of the electrode layer in contact with the electrolyte layer are filled with fine particles made of the same components as the electrolyte layer. Accordingly, contact points between the electrode layer and the electrolyte layer can be increased, and thus the contact properties between the electrode layer and the electrolyte layer can be improved. As a result, an increase in the polarization resistance of the electrochemical element can be suppressed.

In particular, for example, even when the electrolyte layer is formed through treatment in a low-temperature range without performing sintering treatment in a high-temperature range at 1400° C., etc., the plurality of pores that are open on a face of the electrode layer in contact with the electrolyte layer can be filled (clogged) with fine particles made of the same components as the electrolyte layer, and the contact properties between the electrode layer and the electrolyte layer can be improved.

Furthermore, at this time, it is possible to obtain a structure in which contact points between the electrode layer and the electrolyte layer are increased, without the fine particles sintering to each other in a high-temperature range, because the fine particles are inserted into the plurality of pores that are open on a face of the electrode layer in contact with the electrolyte layer.

The electrolyte layer that is formed on the upper side of a porous electrode layer having pores is required to have a high relative density in order to maintain good ion conductivity and good gas barrier properties. At the same time, the fine particles made of the same components as the electrolyte layer with which the pores of the electrode layer are filled are required to have a relative density lower than that of the electrolyte layer in order to ensure gas permeability. If an electrolyte fine particle material is applied onto a porous electrode layer by using a conventional coating method and sintering is performed at a temperature and for a period of time that allow the electrolyte layer to become sufficiently dense to obtain sufficient gas barrier properties, the fine particles of the electrolyte material applied such that the pores of the electrode layer are filled therewith also grow through sintering, and may cause necking on the electrolyte layer side and increase the density, or may be absorbed depending on the sintering time, as a result of which the above-described structure cannot be obtained.

On the other hand, if the electrolyte layer is formed by spraying an electrolyte fine particle material at room temperature using an aerosol deposition method onto the porous electrode layer, necking due to sintering between electrolyte fine particles does not occur for the most part in the pores of the electrode layer, and the pores are filled with an agglomerate of the electrolyte fine particles in the form of independent fine particles, on which a dense and gas-barrier electrolyte layer can be formed. Accordingly, as long as the temperature at which heat treatment or operation is performed is at a temperature that does not cause sintering of the electrolyte material, the above-described structure is maintained and a good electrochemical element can be realized.

In another characteristic configuration of the electrochemical element according to the present invention, the pores include pores whose openings each have a diameter of 0.1 µm or more and 5 µm or less.

With this characteristic configuration, the pores include pores whose openings each have a diameter of 0.1 µm or more and 5 µmm or less. Accordingly, the pores are easily filled with the fine particles, and the contact points between the electrolyte layer and the electrode layer can be easily increased. Note that the pores more preferably include pores whose openings each have a diameter of 0.1 µm or more and 3 µmm or less, and even more preferably include pores whose openings each have a diameter of 0.1 µm or more and 1 µmm or less.

In another characteristic configuration of the electrochemical element according to the present invention, the fine particles include fine particles each having a diameter that is 0.05 µm or more and 0.8 µm or less and is smaller than that of the openings of the pores.

With this characteristic configuration, the fine particles include fine particles each having a diameter that is 0.05 µm or more and 0.8 µm or less and is smaller than that of the openings of the pores. Accordingly, the pores are filled with the fine particles, and the contact points between the electrolyte layer and the electrode layer can be easily increased. Note that the fine particles more preferably include fine particles each having a diameter of 0.1 µm or more and 0.5 µm or less.

In another characteristic configuration of the electrochemical element according to the present invention, the electrolyte layer contains a zirconia-based ceramic.

With this characteristic configuration, the electrolyte layer contains a zirconia-based ceramic. Accordingly, for example, it is possible to realize a high-performance and excellent electrochemical element that can be used in a high-temperature range at about 650° C. or higher.

In another characteristic configuration of the electrochemical element according to the present invention, the electrode layer is made of cermet.

With this characteristic configuration, the electrode layer is made of cermet. Accordingly, the electrode layer is gas-permeable as appropriate, and it is possible to realize a high-performance electrochemical element.

In another characteristic configuration of the electrochemical element according to the present invention, part of the electrolyte layer includes a dense electrolyte layer having a relative density of 90% or more.

With this characteristic configuration, part of the electrolyte layer includes a dense electrolyte layer having a relative density of 90% or more. Accordingly, the electrolyte layer becomes denser and more gastight and has good ion conductivity, and thus an electrochemical element that is highly efficient when used in a fuel cell stack, an electrolysis cell, or the like can be realized. Note that part of the electrolyte layer more preferably includes a dense electrolyte layer having a relative density of 95% or more, and even more preferably includes a dense electrolyte layer having a relative density of 98% or more.

In another characteristic configuration of the electrochemical element according to the present invention, crystal grains in the electrolyte layer include crystal grains each having a grain size of 0.5 µm or less.

With this characteristic configuration, crystal grains in the electrolyte layer include crystal grains each having a grain size of 0.5 µm or less. Accordingly, it is possible to realize an electrochemical element that has a denser electrolyte layer and is strong. Note that crystal grains in the electrolyte layer more preferably include crystal grains each having a grain size of 0.3 µm or less, and even more preferably include crystal grains each having a grain size of 0.1 µm or less.

In another characteristic configuration of the electrochemical element according to the present invention, the electrode layer is provided on a front face of a metal substrate, and a plurality of through holes passing through the front face and a back face of the metal substrate are provided inside a region, of the metal substrate, in which the electrode layer is provided, and the electrolyte layer has a first portion coating the electrode layer, and a second portion that is in contact with the front face of the metal substrate.

With this characteristic configuration, a plurality of through holes passing through the front face and the back face of the metal substrate are provided inside a region, of the metal substrate, in which the electrode layer is provided, and the electrolyte layer has a first portion coating the electrode layer, and a second portion that is in contact with the front face of the metal substrate. Accordingly, even in the case where the binding strength between the electrolyte layer and the electrode layer is not so strong, the electrolyte layer can be firmly fixed to the metal substrate by the second portion, and the electrochemical element as a whole can be made to be excellent in terms of robustness. Furthermore, the second portion can suppress the leakage of gas from the electrode layer. This aspect will be described below. While the electrochemical element is in operation, gas is supplied from the back side of the metal substrate via the through holes to the electrode layer. If the end portion of the electrode layer is exposed at a part thereof where the second portion is not provided, leakage of gas may occur therefrom. If the end portion of the electrode layer is reliably covered by the second portion, it is possible to suppress the leakage of gas without providing another member such as a gasket.

In another characteristic configuration of the electrochemical element according to the present invention, the metal substrate is made of a ferrite-based stainless steel.

With this characteristic configuration, the metal substrate is made of a ferrite-based stainless steel. Accordingly, the metal substrate can be made to be excellent in terms of thermal resistance and corrosion resistance, and the durability and the reliability of the electrochemical element can be increased. Furthermore, since the metal substrate is made of a ferrite-based stainless steel, it has a coefficient of thermal expansion close to those of materials such as YSZ (yttrium-stabilized zirconia) or GDC (gadolinium-doped ceria) for forming the electrode layer or the electrolyte layer. Accordingly, even when temperature cycles between a low temperature and a high temperature are repeated, fracture is not likely to occur. Thus, it is possible to obtain an electrochemical element that has excellent long-term durability.

In order to achieve the above-described object, the present invention is directed to a solid oxide fuel cell in which a counter electrode layer functioning as a counter electrode of the electrode layer is provided on the electrolyte layer of the above-described electrochemical element.

With this characteristic configuration, a solid oxide fuel cell stack (SOFC) has a configuration in which a counter electrode layer functioning as a counter electrode of the electrode layer is provided on the electrolyte layer of the electrochemical element. Accordingly, it is possible to realize a solid oxide fuel cell including a dense and highly-gastight electrolyte layer while the treatment temperature during formation of the electrolyte layer is suppressed to a low temperature.

In order to achieve the above-described object, the present invention is directed to a method for producing an electrochemical element having an electrode layer having a plurality of pores, and an electrolyte layer, including: an electrolyte layer forming step of forming the electrolyte layer on the electrode layer by using an aerosol deposition method, wherein, in the electrolyte layer forming step, the pores are filled with fine particles made of the same components as the electrolyte layer.

That is to say, with this characteristic configuration, the method includes an electrolyte layer forming step of forming the electrolyte layer on the electrode layer by using an aerosol deposition method, wherein, in the electrolyte layer forming step, while the treatment temperature during formation of the electrolyte layer is suppressed to a low temperature, the pores are filled with fine particles made of the same components as the electrolyte layer, and a high-performance electrochemical element in which the contact properties between the dense and highly-gastight electrolyte layer and the electrode layer are improved can be realized.

In order to achieve the above-described object, the present invention is directed to a method for producing an electrochemical element having a metal substrate, an electrode layer having a plurality of pores, and an electrolyte layer, including: an electrode layer forming step of forming the electrode layer on a front face of the metal substrate; and an electrolyte layer forming step of forming the electrolyte layer on the electrode layer by using an aerosol deposition method, wherein, in the electrolyte layer forming step, the pores are filled with fine particles made of the same components as the electrolyte layer.

That is to say, with this characteristic configuration, the method includes an electrode layer forming step of forming the electrode layer on a front face of the metal substrate, and an electrolyte layer forming step of forming the electrolyte layer on the electrode layer by using an aerosol deposition method, wherein, in the electrolyte layer forming step, while the treatment temperature during formation of the electrolyte layer is suppressed to a low temperature, the pores are filled with fine particles made of the same components as the electrolyte layer, and a high-performance electrochemical element can be realized without damaging the metal substrate in high-temperature treatment.

In another characteristic configuration of the method for producing an electrochemical element according to the present invention, the temperature in heat treatment performed in the electrolyte layer forming step and the electrode layer forming step is 1100° C. or lower.

Obtaining a dense and highly-gastight electrolyte layer by performing heat treatment in a low-temperature range at 1100° C. or lower, etc., without performing heat treatment in a high temperature at 1400° C., etc. as in conventional examples in the electrolyte layer forming step is advantageous in that the production cost of the electrochemical element can be reduced. Furthermore, in particular, forming an electrode layer using an aerosol deposition method is advantageous in that the production cost can be significantly reduced because the electrolyte layer can be formed without performing heat treatment. Note that, when forming an electrode layer using an aerosol deposition method, if necessary, annealing treatment may be performed after the electrode layer has been formed using the aerosol deposition method. The annealing treatment can also be performed in a low-temperature range at, for example, 1100° C. or lower, preferably 1000° C. or lower, and more preferably 900° C. or lower. On the other hand, if the temperature in the heat treatment of the metal substrate is higher than 1100° C., the mutual diffusion of elements between the metal substrate and the electrode layer may increase. Thus, if the temperature in the heat treatment performed in the electrode layer forming step is 1100° C. or lower, it is possible to produce an electrochemical element in which the mutual diffusion of elements between the metal substrate and the electrode layer is suppressed. Note that, the temperature in the heat treatment performed in the electrolyte layer forming step and the electrode layer forming step is more preferably 1050° C. or lower, and even more preferably 1000° C. or lower.

In another characteristic configuration of the method for producing an electrochemical element according to the present invention, in the electrolyte layer forming step, an electrolyte layer having a first portion coating the electrode layer, and a second portion that is in contact with a front face of a metal substrate is formed by spraying an aerosolized raw material powder onto an area extending over the electrode layer and the front face of the metal substrate.

With this characteristic configuration, the method includes an electrolyte layer forming step of forming an electrolyte layer having a first portion coating the electrode layer, and a second portion that is in contact with a front face of a metal substrate, by spraying an aerosolized raw material powder onto an area extending over the electrode layer and the front face of the metal substrate. Accordingly, even in the case where the binding strength between the electrolyte layer and the electrode layer is not so strong, the electrolyte layer can be firmly fixed by to the metal substrate the second portion, and the electrochemical element as a whole can be made to be excellent in terms of robustness. Furthermore, it is possible to produce an electrochemical element in which the second portion suppresses the leakage of gas from the electrode layer. This aspect will be described below. While the electrochemical element is in operation, gas is supplied from the back side of the metal substrate via the through holes to the electrode layer. If the end portion of the electrode layer is exposed at a part thereof where the second portion is not provided, leakage of gas may occur therefrom. If the end portion of the electrode layer is reliably covered by the second portion, it is possible to suppress the leakage of gas without providing another member such as a gasket.

In order to achieve the above-described object, the present invention is directed to a method for producing a solid oxide fuel cell stack, including a counter electrode layer forming step of, after the above-described method for producing an electrochemical element is performed, forming a counter electrode layer functioning as a counter electrode of the electrode layer, on the electrolyte layer.

With this characteristic configuration, a solid oxide fuel cell stack (SOFC) is produced in which a counter electrode layer functioning as a counter electrode of the electrode layer is provided on the electrolyte layer of the electrochemical element. Accordingly, it is possible to produce a high-performance solid oxide fuel cell stack while the treatment temperature during formation of the electrolyte layer is suppressed to a low temperature.

BEST MODE FOR CARRYING OUT THE INVENTION

First Embodiment

Hereinafter, an electrochemical element 1, a solid oxide fuel cell stack (SOFC) 100, a method for producing the electrochemical element, and a method for producing the SOFC will be described with reference to FIGS. 1 and 2. In the description of positional relationships between layers and the like, for example, an electrolyte layer 4 side as seen from an electrode layer is referred to as "upper" or "upper side", and a metal substrate 2 side as seen from the electrode layer is referred to as "lower" or "lower side".
Electrochemical Element 1
The electrochemical element 1 includes a metal substrate 2 having a plurality of through holes 21, an electrode layer 3 provided on a front face of the metal substrate 2, and an electrolyte layer 4 provided on the electrode layer 3. The electrode layer 3 is configured so as to be electron-conductive and gas-permeable. The electrolyte layer 4 is configured so as to be oxygen ion-conductive.
Metal Substrate 2
The metal substrate 2 has a function of maintaining the strength of the electrochemical element 1 by supporting the electrode layer 3 and the electrolyte layer 4. As a material for forming the metal substrate 2, a material that has excellent electron conductivity, thermal resistance, oxidation resistance, and corrosion resistance is used. For example, a ferrite-based stainless steel, an austenite-based stainless steel, a nickel-based alloy, or the like are used. In particular, an alloy containing chromium is preferably used.
The metal substrate 2 has the plurality of through holes 21 provided passing through the front face and the back face of the metal substrate 2. For example, the through holes 21 can be provided passing through the metal substrate 2 by performing laser processing or the like. The through holes 21 have a function of allowing gas to pass therethrough from the back face to the front face of the metal substrate 2. In order to make the metal substrate 2 gas-permeable, porous metals can also be used. The through holes 21 are preferably provided inside the region, of the metal substrate 2, in which the electrode layer 3 is provided.

The surface of the metal substrate 2 is preferably provided with a thin metal oxide film 22. The metal oxide film 22 is preferably provided not only on faces of the metal substrate 2 exposed to the outside, but also on faces (interfaces) thereof in contact with the electrode layer 3 and faces inside the through holes 21. The metal oxide film 22 can suppress the mutual diffusion of elements between the metal substrate 2 and the electrode layer 3. For example, if a ferrite-based stainless steel is used as the metal substrate 2, the metal oxide film 22 is mainly made of a chromium oxide. In this case, the diffusion of chromium atoms and the like of the metal substrate 2 to the electrode layer 3 or the electrolyte layer 4 can be suppressed by the metal oxide film 22 mainly made of a chromium oxide. The thickness of this metal oxide film is preferably of the submicron order. For example, the average thickness is preferably approximately 0.3 μm or more and 0.7 μm or less. The minimum film thickness is preferably about 0.1 μm or more. The maximum film thickness is preferably about 1.1 μm or less.
Note that the thus formed metal oxide film 22 may be referred to as an element mutual diffusion suppressing layer. The element mutual diffusion suppressing layer can suppress the diffusion of chromium atoms and the like of the metal substrate 2 to the electrode layer 3 or the electrolyte layer 4.
If the metal substrate 2 is made of a ferrite-based stainless steel, it has a coefficient of thermal expansion close to those of materials such as YSZ (yttria-stabilized zirconia) or GDC (gadolinium-doped ceria, also referred to as CGO) for forming the electrode layer 3 or the electrolyte layer 4. Accordingly, even when temperature cycles between a low temperature and a high temperature are repeated, the electrochemical element 1 is not likely to be damaged. Thus, this configuration is preferable because it is possible to realize an electrochemical element 1 that has excellent long-term durability.
Electrode Layer 3
As shown in FIG. 1, the electrode layer 3 is provided in a state of being a thin film in the region, of the front face of the metal substrate 2, in which the through holes 21 are provided. As a material for forming the electrode layer 3, for example, cermet materials such as NiO—CGO (gadolinium-doped ceria), Ni—CGO, NiO—YSZ, Ni—YSZ, CuO—$CeO_2$, or Cu—$CeO_2$ can be used. In these examples, CGO, YSZ, and $CeO_2$ can be referred to as cermet aggregate. The electrode layer 3 is preferably formed using a low-temperature sintering method (e.g., wet method using sintering in a low-temperature range without performing sintering in a high-temperature range at 1400° C., etc.), an aerosol deposition method, a flame gunning method (a thermal spraying method), or the like. With these processes that can be used in a low-temperature range, for example, it is possible to obtain a good electrode layer 3 without performing sintering in a high-temperature range at 1400° C., etc. Thus, this configuration is preferable because it is possible to realize an electrochemical element that has excellent durability, in which the metal substrate 2 is not damaged, and mutual diffusion of elements between the metal substrate 2 and the electrode layer 3 can be suppressed. Furthermore, the low-temperature sintering method is more preferably used because it is easy to handle the raw materials.
The electrode layer 3 may include insertion portions 33 that are inserted into the through holes 21 of the metal substrate 2 and block the through holes 21. If necessary, the electrode layer 3 may have a multi-layer structure consisting of, for example, a first layer 32 (lower part) that is adjacent to the front face of the metal substrate, and a second layer 31 (upper part) that is provided on the first layer 32 and is adjacent to the electrolyte layer 4.

In order to make the electrode layer 3 gas-permeable, its interior and surface have a plurality of pores 34. The pores 34 may have a size selected as appropriate so as to allow reactions to progress smoothly in electrochemical reaction. The pores 34 preferably include pores whose openings 35 each have a diameter of 0.1 μm or more and 5 μmm or less. With this configuration, the pores 34 are likely to be filled (clogged) with fine particles 43 made of the same components as the electrolyte layer 4, contact points between the electrolyte layer 4 and the electrode layer 3 can be easily increased, and the contact properties between the electrode layer 3 and the electrolyte layer 4 can be improved. The pores 34 more preferably include pores whose openings 35 each have a diameter of 0.1 μm or more and 3 μmm or less, and even more preferably include pores whose openings 35 each have a diameter of 0.1 μm or more and 1 μmm or less.

The insertion portions 33, the first layer 32, and the second layer 31 are preferably made of the same material, but may be made of respectively different materials. For example, they may be made of materials containing different elements, or materials having different element ratios. Furthermore, the insertion portions 33, the first layer 32, and the second layer 31 may have different content ratios of cermet aggregate, density, and strength. The number of layers in the electrode layer 3 may be three or more, or may be one.

Furthermore, the electrode layer 3 may be configured such that the content ratio of cermet aggregate, the density, and the strength successively increase from bottom to top of the electrode layer 3. In this case, the electrode layer 3 may not have regions clearly identified as layers. However, also in this case, in the electrode layer 3, a part (upper part) adjacent to the electrolyte layer 4 may have a content ratio of cermet aggregate, a density, strength, and the like higher than those of a part (lower part) adjacent to the metal substrate 2.

For example, a configuration is possible in which the second layer 31 (upper part) adjacent to the electrolyte layer 4 has a strength higher than that of the first layer 32 (lower part) adjacent to the front face of the metal substrate. Accordingly, it is conceivable that an aerosol deposition method that may have an impact on the electrode layer 3 functioning as a base layer can be easily applied in the formation of the electrolyte layer 4. With this method for forming the electrolyte layer 4, a dense electrolyte layer can be formed through treatment at a low temperature, and the durability of the electrochemical element 1 is expected to improve because treatment at a high temperature is not performed.

Furthermore, a configuration in which the second layer 31 (upper part) has a strength higher than that of the first layer 32 (lower part) can be realized by, for example, methods for making the types of cermet material, the particle sizes of a material powder that is used, or production conditions different therebetween. Furthermore, as described later, the configuration in which the second layer 31 (upper part) has a strength higher than that of the first layer 32 (lower part) can be realized also by making the content ratios of cermet aggregate different therebetween.

Furthermore, the electrode layer 3 may be configured such that the second layer 31 (upper part) adjacent to the electrolyte layer 4 has a density higher than that of the first layer 32 (lower part) adjacent to the front face of the metal substrate. Accordingly, since the electrolyte layer 4 is formed on the dense surface, the density of the electrolyte layer 4 can be improved as well. Meanwhile, although gas permeability is required for an electrode layer of an electrochemical element, the gas permeability decreases in accordance with an increase in density. Thus, while the lower part is configured to have a density lower than that of the upper part so as to ensure gas permeability, the upper part is configured to have a density higher than that of the lower part so that the binding strength between the electrode layer 3 and the electrolyte layer 4 and the density of the electrolyte layer 4 can be improved.

Furthermore, a configuration in which the second layer 31 (upper part) has a density higher than that of the first layer 32 (lower part) can be realized by, for example, methods for making the types of cermet material, the particle sizes of a material powder that is used, or production conditions different therebetween. Furthermore, as described later, the configuration in which the second layer 31 (upper part) has a density higher than that of the first layer 32 (lower part) can be realized also by making the content ratios of cermet aggregate different therebetween.

Note that density is the proportion by which the material forming the electrode layer 3 occupies in a space. That is to say, if the second layer 31 (upper part) has a density higher than that of the first layer 32 (lower part), the first layer 32 has a proportion of voids or pores present in the surface or interior thereof, higher than that of the second layer 31.

For example, a configuration is possible in which the second layer 31 (upper part) adjacent to the electrolyte layer 4 has a content ratio of cermet aggregate higher than that of the first layer 32 (lower part) adjacent to the front face of the metal substrate. Accordingly, since the strength and the density of the upper part can be increased, it is conceivable that an aerosol deposition method that may have an impact on the electrode layer 3 functioning as a base layer can be easily applied in the formation of the electrolyte layer 4. With this method for forming the electrolyte layer 4, a dense electrolyte layer can be formed through treatment at a low temperature, and the durability of the electrochemical element 1 is expected to improve because treatment at a high temperature is not performed. Note that the state in which the content ratio of cermet aggregate is high refers to a state in which the content ratio of metal or metal oxide (e.g., NiO-CGO) mixed in the cermet material is low.

Figure 1:
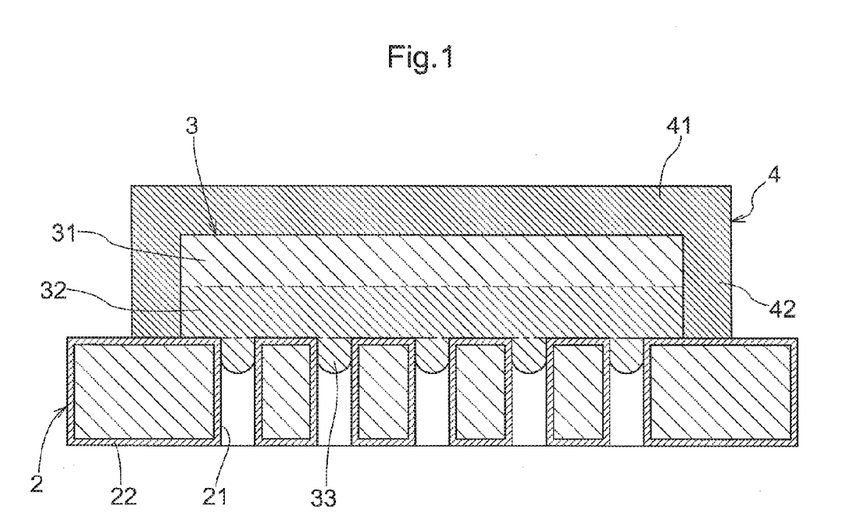
FIG. 1 is a cross-sectional view showing the configuration of an electrochemical element.
Figure 2:
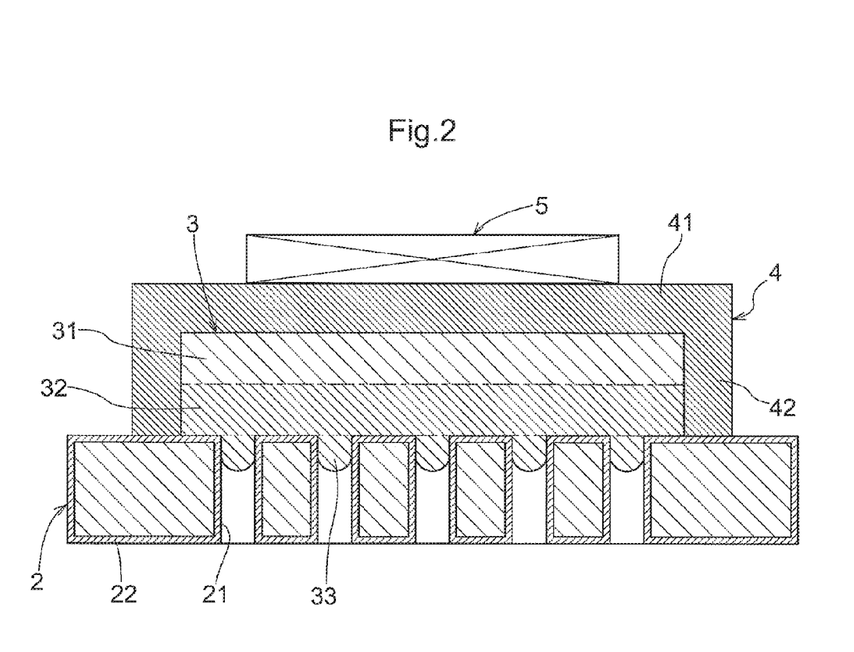
FIG. 2 is a cross-sectional view showing the configuration of a solid oxide fuel cell stack.

As shown in FIG. 1, the insertion portions 33 are provided in a state of being inserted into the through holes 21 and blocking the through holes 21. For example, the insertion portions can be provided in a state of being inserted into the through holes 21 to a depth of approximately several micrometers. Furthermore, they can be inserted to a depth of approximately several micrometers or more. If the electrode layer 3 has the insertion portions 33, defects in the electrode layer 3 can be suppressed, as a result of which it is possible to form a good electrolyte layer 4, and to realize a superior electrochemical element 1.

Electrolyte Layer 4

The electrolyte layer 4 is formed on the upper side of the electrode layer 3. The electrolyte layer 4 may have a structure including a first portion 41 coating the electrode layer 3 and a second portion 42 that is in contact with the front face of the metal substrate 2. In this case, as shown in FIG. 1, the electrolyte layer 4 is provided on an area extending over (across) the electrode layer 3 and the front face of the metal substrate 2 in a horizontal cross-sectional view. Accordingly, the electrolyte layer 4 can be firmly fixed to the metal substrate 2 by the second portion 42, and the electrochemical element as a whole can be made to be excellent in terms of robustness.

Furthermore, the second portion 42 can suppress the leakage of gas from the electrode layer 3. This aspect will be described below. While the electrochemical element 1 is in operation, gas is supplied from the back side of the metal substrate 2 via the through holes 21 to the electrode layer 3. At the part having the second portion 42, it is possible to suppress the leakage of gas without providing another member such as a gasket. Note that, although the periphery of the electrode layer 3 is completely covered by the second portion 42 in this embodiment, a configuration is also possible in which the upper side of the electrode layer 3 is provided with the electrolyte layer 4, and the periphery thereof is provided with gaskets or the like.

As a material for forming the electrolyte layer 4, YSZ (yttria-stabilized zirconia), SSZ (scandium-stabilized zirconia), GDC (gadolinium-doped ceria), or the like can be used. In particular, a zirconia-based ceramic is preferably used. If the electrolyte layer 4 is made of a zirconia-based ceramic, the temperature during operation of the electrochemical element 1 can be made to be higher than that of a ceria-based ceramic. For example, if the electrochemical element 1 is used in an SOFC, a material that can be used in a high-temperature range at approximately 650° C. or higher, such as YSZ, is used as the material for forming the electrolyte layer 4. Then, a system configuration is used in which a hydrocarbon-based gas such as town gas or LPG is used as a raw fuel, and anode gas is obtained from the raw fuel by steam reforming. With this configuration, heat generated in the SOFC cell stack can be used for reforming of the raw fuel gas, and thus it is possible to build an efficient SOFC system.

The electrolyte layer 4 is preferably formed by using an aerosol deposition method. With this sort of film-formation process that can be used in a low-temperature range, for example, it is possible to obtain a dense and highly-gastight electrolyte layer 4 without using a sintering process in a high-temperature range at 1400° C., etc. It is possible to obtain a structure in which the plurality of pores 34 that are open on a face, of the electrode layer 3, in contact with the electrolyte layer 4 are filled (clogged) with the fine particles 43 made of the same components as the electrolyte layer 4, by selecting appropriate conditions in the aerosol deposition method. That is, for example, also with a film-formation process in which a sintering process is not performed in a high-temperature range at 1400° C., etc., contact points between the electrode layer 3 and the electrolyte layer 4 can be increased, and thus the contact properties between the electrode layer 3 and the electrolyte layer 4 can be improved. As a result, an increase in the polarization resistance of the electrochemical element 1 can be suppressed.

Figure 5:
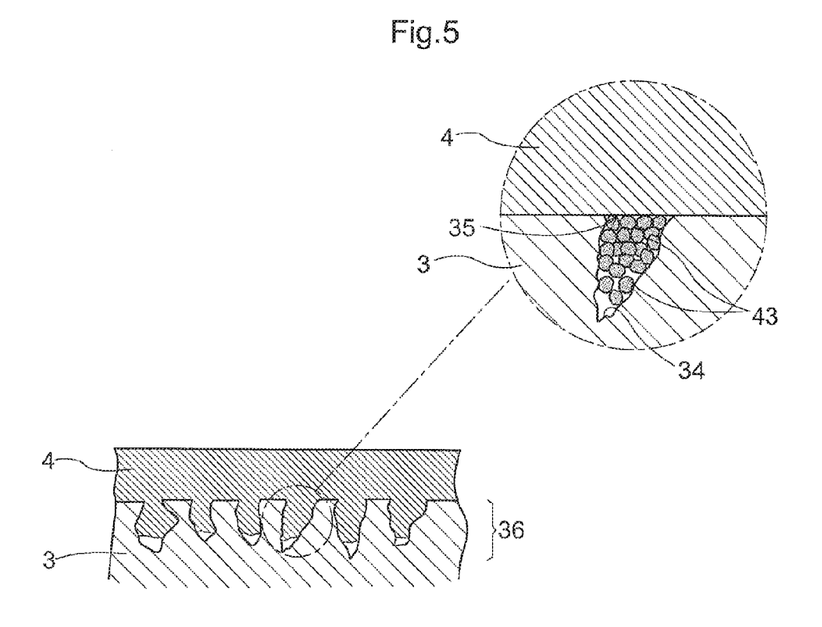
FIG. 5 is a schematic diagram of an interface between an electrode layer and an electrolyte layer.

The structure in which the electrode layer 3 is configured such that the plurality of pores 34 that are open on a face thereof in contact with the electrolyte layer 4 are filled with the fine particles 43 in this manner preferably includes a polarization resistance increase suppressing layer 36 for suppressing an increase in the polarization resistance of the electrochemical element. That is to say, as shown in FIG. 5, the electrode layer 3 may include the polarization resistance increase suppressing layer 36, at a face thereof in contact with the electrolyte layer 4. The polarization resistance increase suppressing layer 36 has the plurality of pores 34 that are open on a face thereof in contact with the electrolyte layer 4. The pores 34 are filled with the fine particles 43 made of the same components as the electrolyte layer 4. The polarization resistance increase suppressing layer 36 increases contact points between the electrode layer 3 and the electrolyte layer 4, thereby improving the contact properties between the electrode layer 3 and the electrolyte layer 4. As a result, the polarization resistance increase suppressing layer 36 can suppress an increase in the polarization resistance of the electrochemical element 1.

Furthermore, if the electrolyte layer 4 is formed by spraying an electrolyte fine particle material at room temperature using the aerosol deposition method onto the porous electrode layer 3, necking due to sintering between electrolyte fine particles does not occur for the most part in the pores 34 of the electrode layer 3, and the pores 34 are filled with an agglomerate of the electrolyte fine particles in the form of independent fine particles, on which a dense and gas-barrier electrolyte layer 4 can be formed. Accordingly, as long as the temperature at which heat treatment or operation is performed is at a temperature that does not cause sintering of the electrolyte material, the above-described structure is maintained and a good electrochemical element 1 can be realized.

Part of the electrolyte layer 4 preferably includes a dense electrolyte layer having a relative density of 90% or more. With this configuration, the electrolyte layer 4 becomes denser and more gastight and has good ion conductivity, and thus an electrochemical element 1 that is highly efficient when used in a fuel cell stack, an electrolysis cell, or the like can be realized. Note that part of the electrolyte layer 4 more preferably includes a dense electrolyte layer having a relative density of 95% or more, and even more preferably includes a dense electrolyte layer having a relative density of 98% or more. The relative density refers to a proportion of the density of the actually formed electrolyte layer 4 relative to the theoretical density of an electrolyte material.

Solid Oxide Fuel Cell Stack (SOFC) 100

The structure in which a counter electrode layer 5 functioning as a counter electrode of the electrode layer 3 is provided on the electrolyte layer 4 of the thus configured electrochemical element 1 can be used as the solid oxide fuel cell stack 100 that operates as follows. As a material for forming the counter electrode layer 5 functioning as a counter electrode of the electrode layer 3, for example, a complex oxide such as LSCF or LSM can be used. The counter electrode layer 5 is preferably formed using a low-temperature sintering method (e.g., wet method using sintering in a low-temperature range without performing sintering in a high-temperature range at 1400° C., etc.), an aerosol deposition method, a flame gunning method (a thermal spraying method), or the like. With these processes that can be used in a low-temperature range, for example, it is possible to obtain a good counter electrode layer 5 without performing sintering in a high-temperature range at 1400° C., etc. Thus, this configuration is preferable because it is possible to realize an electrochemical element that has excellent durability, in which the metal substrate 2 is not damaged, and mutual diffusion of elements between the metal substrate 2 and the electrode layer 3 can be suppressed.

If an SOFC is configured in this manner, for example, fuel gas containing hydrogen is supplied from the back face of the metal substrate 2 via the through holes 21 to the electrode layer 3, air is supplied to the counter electrode layer 5 functioning as a counter electrode of the electrode layer 3, and, for example, the operation temperature is kept at approximately 700° C. Thus, in the counter electrode layer 5, oxygen $O_2$ contained in air reacts with an electron $e^-$, and thus an oxygen ion $O^{2-}$ is produced. The oxygen ion $O^{2-}$ moves through the electrolyte layer 4 to the electrode layer 3. In the electrode layer 3, hydrogen $H_2$ contained in the supplied fuel gas reacts with the oxygen ion $O^{2-}$, and water $H_2O$ and an electron $e^-$ are produced. Through these reactions, an electromotive force is generated between the electrode layer 3 and the counter electrode layer 5. In this case, the electrode layer 3 functions as a fuel electrode (anode) of the fuel cell stack, and the counter electrode layer 5 functions as an air electrode (cathode).

Method For Producing Electrochemical Element 1

Next, the method for producing the electrochemical element 1 will be described.

Electrode Layer Forming Step

In the electrode layer forming step, for example, the electrode layer 3 is formed in a region larger than the region, of the front face of the metal substrate 2, in which the through holes 21 are provided. The electrode layer forming step may include a preliminary applying step, a pushing and wiping step, and a main applying step (that may further include a plurality of steps consisting of a first forming step, a second forming step, and the like). Furthermore, the preliminary applying step and the pushing and wiping step may be omitted such that the electrode layer forming step includes only the main applying step.

Note that the through holes of the metal substrate 2 can be provided by performing laser processing or the like.

Preliminary Applying Step

In the preliminary applying step, electrode layer material paste containing a material for forming the electrode layer 3 is applied to the front face of the metal substrate 2. First, paste in which a powder of a material for forming the electrode layer 3, which is a cermet material, is mixed in organic solvent is formed. Next, the formed paste is added dropwise or applied to the region, of the metal substrate 2, in which the through holes 21 are provided. At this time, part of the paste flows into the through holes 21 as per the capillary phenomenon.

Pushing and Wiping Step

In the following pushing and wiping step, the paste on the surface of the metal substrate 2 is wiped by a blade or the like. That is to say, the paste is pushed into the through holes 21, and the paste remaining on the front face of the metal substrate 2 is wiped away. Accordingly, the through holes 21 are filled (blocked) with the paste, and excessive paste is removed from the surface of the metal substrate 2, and thus the surface of the metal substrate 2 becomes smooth. That is to say, the through holes 21 of the metal substrate 2 are filled with the electrode layer material paste. After the pushing and wiping step is performed, the metal substrate 2 may be dried.

Note that the preliminary applying step and the pushing and wiping step may be performed together by selecting appropriate paste and setting various conditions as appropriate and using a screen printing method.

Main Applying Step, First Forming Step

In the following main applying step (first forming step), paste having a solvent dilution ratio lower than that of the electrode layer material paste used in the preliminary applying step can be used. That is to say, the solvent dilution ratio of the electrode layer material paste used in the preliminary applying step may be higher than the solvent dilution ratio of the electrode layer material paste used in the main applying step. The paste is applied to a region larger than the region, of the metal substrate 2, in which the through holes 21 are provided. The application is performed, for example, by using a spray blowing method or a screen printing method to a uniform thickness. With the first forming step, the first layer 32 (lower part) of the electrode layer 3 is formed.

If the preliminary applying step, the pushing and wiping step, and the main applying step are performed in the electrode layer forming step, it is possible to form an electrode layer 3 that has a smooth upper face while forming the insertion portions 33 that are inserted into the through holes 21 of the metal substrate 2 and block the through holes 21. Thus, a dense electrolyte layer 4 can be formed on the electrode layer 3, and an electrochemical element 1 that has superior robustness can be produced. Furthermore, the electrolyte layer 4 can be formed through a low-temperature process such as an aerosol deposition method on the obtained smooth electrode layer 3, and an electrochemical element 1 that has excellent durability can be produced because heat treatment at a high temperature is not performed.

Furthermore, the solvent dilution ratio of the electrode layer material paste used in the preliminary applying step may be higher than the solvent dilution ratio of the electrode layer material paste used in the main applying step. Accordingly, in the preliminary applying step, electrode layer material paste having a high solvent dilution ratio is applied to the surface of the metal substrate 2, and thus the material for forming the electrode layer 3 is likely to enter into the through holes 21 of the metal substrate 2. Accordingly, the through holes 21 can be more reliably filled (blocked) with the electrode layer material, and an electrode layer 3 having a smoother surface can be obtained. That is to say, a denser electrolyte layer 4 can be formed on the electrode layer 3, and an electrochemical element 1 that has superior robustness can be produced. Furthermore, the electrolyte layer 4 can be formed through a low-temperature process such as an aerosol deposition method on the obtained smooth electrode layer 3, and an electrochemical element 1 that has excellent durability can be produced because heat treatment at a high temperature is not performed.

Main Applying Step, Second Forming Step

In the following second forming step, paste having a cermet aggregate mixed proportion higher than that of the electrode layer material paste used in the first forming step can be used. The paste can be applied in an overlapping manner to the region to which the paste was applied in the first forming step. The application is performed, for example, by using a spray blowing method or a screen printing method to a uniform thickness. With the second forming step, the second layer 31 (upper part) of the electrode layer 3 can be formed.

If the second forming step of, after the first forming step, forming the electrode layer 3 using an electrode layer material in which the aggregate mixed proportion is a second proportion, which is higher than a first proportion, is performed, the aggregate mixed proportion can be made to be higher in the upper portion in the electrode layer 3 than in the lower portion. Accordingly, it is possible to increase the strength and the density of the upper portion in the electrode layer 3, and to form the electrolyte layer 4 at a low temperature and ensure the gas permeability of the electrode layer 3. Accordingly, an electrochemical element 1 whose robustness and durability are increased can be produced.

Note that the main applying step may include only the first forming step, or may further include a third and subsequent forming steps of the same type.

It is also possible to omit the preliminary applying step and the pushing and wiping step by preferably adjusting the electrode layer material paste for use in the main applying step.

Furthermore, in the main applying step, degreasing treatment of performing heating at a temperature of approximately 400° C. to 450° C. may be performed after the electrode layer 3 is applied onto the metal substrate 2.

Sintering Step

After the main applying step is performed, it is possible to perform a sintering step of heating the metal substrate 2 on which the electrode layer 3 is formed, thereby sintering the electrode layer 3 and forming the metal oxide film 22 on the surface of the metal substrate 2. The sintering step is performed, for example, through heating at 800° C. to 1100° C. in a mixture gas atmosphere adjusted by humidifying mixture gas of hydrogen and nitrogen. If the sintering step is performed in these conditions, the thickness of the metal oxide film 22 can be set to a preferable thickness of the submicron order. An excessively thick metal oxide film 22 is problematic in that the electrical resistance of the metal substrate 2 becomes too large, and the metal oxide film 22 becomes fragile. On the other hand, an excessively thin metal oxide film 22 is also problematic in that the effect of suppressing mutual diffusion of elements between the metal substrate 2 and the electrode layer 3 becomes insufficient. Thus, for example, the average thickness of the metal oxide film 22 is preferably approximately 0.3 μm or more and 0.7 μm or less. Furthermore, the minimum film thickness is preferably about 0.1 μm or more. The maximum film thickness is preferably about 1.1 μm or less.

If the above-described sintering step is performed after the electrode layer forming step is performed, sintering of the electrode layer 3 and formation of the metal oxide film 22 can be performed together. Since the electrode layer 3 is gas-permeable, the metal oxide film 22 is formed on the surface of the metal substrate 2 on faces thereof exposed to the outside, faces (interfaces) thereof in contact with the electrode layer 3, and inner faces of the through holes 21. With the metal oxide film 22, the mutual diffusion of elements between the metal substrate 2 and the electrode layer 3 can be suppressed. Thus, it is possible to simplify the production process because additional layers such as coating films do not have to be provided.

Furthermore, it is desirable that the sintering step is performed under conditions adjusted to an oxygen partial pressure of $1.0 \times 10^{-20}$ atm or more and $5.0 \times 10^{-15}$ atm or less. If the sintering is performed in an environment having low oxygen partial pressure in this manner, it is possible to form a metal oxide film 22 that has an appropriate and uniform thickness and that is dense and is not likely to peel off, and to produce an electrochemical element 1 that can more reliably suppress the mutual diffusion of elements. Note that an excessively thin metal oxide film 22 may result in an insufficient function regarding mutual diffusion of elements between the metal substrate 2 and the electrode layer 3, whereas an excessively thick metal oxide film 22 may allow defects such as cracks to occur in the metal oxide film 22 and adversely affect the strength of the metal oxide film 22, or may increase the electrical resistance of the metal oxide film 22 and reduce the performance of the electrochemical element. Thus, it is preferable that the metal oxide film 22 is formed to have an appropriate film thickness.

Furthermore, it is desirable that the sintering step is performed in mixture gas adjusted by humidifying mixture gas of hydrogen and nitrogen. If the heating is performed in such a mixture gas atmosphere to the sintering temperature, the atmosphere has a very low oxygen partial pressure, and it is possible to form a metal oxide film 22 that is thin and dense and is not likely to peel off, and to produce an electrochemical element 1 that can more reliably suppress the mutual diffusion of elements.

The sintering step is preferably performed through heating at 800° C. to 1100° C. In particular, the heating is performed preferably at 1050° C. or lower, and more preferably at 1000° C. or lower. If the temperature of the mixture gas is higher than 1100° C., the oxygen partial pressure may become large, and mutual diffusion of elements between the metal substrate 2 and the electrode layer 3 may increase. On the other hand, if the sintering temperature is lower than 800° C., the strength of the electrode layer 3 may be insufficient, or the metal oxide film 22 may be too thin, and thus the function of suppressing mutual diffusion of elements between the metal substrate 2 and the electrode layer 3 may be insufficient. Accordingly, if the sintering step is performed at 800° C. to 1100° C., it is possible to form an electrode layer having an appropriate strength and density while forming the metal oxide film 22 having an appropriate thickness, and to produce an electrochemical element 1 that has excellent durability.

Furthermore, the sintering step may further include a step of, after sintering is performed under conditions adjusted to an oxygen partial pressure of $1.0 \times 10^{-20}$ atm or more and $5.0 \times 10^{-15}$ atm or less, performing sintering again under conditions (e.g., in air, etc.) in which the oxygen partial pressure is higher than $5.0 \times 10^{-15}$ atm. With this configuration, first, a metal oxide film 22 having an appropriate thickness is formed under conditions adjusted to an oxygen partial pressure of $1.0 \times 10^{-20}$ atm or more and $5.0 \times 10^{-15}$ atm or less, after which a sintering step is additionally performed with a higher oxygen partial pressure. Accordingly, it is possible to increase the strength of the electrode layer 3 while suppressing an increase in the thickness of the metal oxide film 22 and an increase in the electrical resistance of the metal substrate 2. Thus, after this step, it is easy to form the electrolyte layer 4 using an aerosol deposition method that may have an impact on the electrode layer 3 functioning as a base layer.

Electrolyte Layer Forming Step

After the sintering step, that is, after the electrode layer forming step, the electrolyte layer forming step is performed. In the electrolyte layer forming step, an electrolyte material, which is a material for forming the electrolyte layer 4, is affixed continuously to an area extending over the electrode layer 3 and the front face of the metal substrate 2, so that the electrolyte layer 4 having the first portion 41 coating the electrode layer 3 and the second portion 42 that is in contact with the front face of the metal substrate 2 is formed.

The electrolyte layer forming step is preferably performed using an aerosol deposition method. Accordingly, it is possible to produce an electrochemical element having a dense and highly-gastight electrolyte layer 4 without performing heat treatment at a high temperature. Thus, it is possible to suppress the mutual diffusion of elements between the metal substrate 2 and the electrode layer 3 without providing an additional diffusion preventing layer, and to realize an electrochemical element that has excellent durability.

Method For Producing Solid Oxide Fuel Cell Stack, Counter Electrode Layer Forming Step The solid oxide fuel cell stack 100 can be produced by performing a counter electrode layer forming step of forming the counter electrode layer 5 functioning as a counter electrode of the electrode layer 3, on the electrolyte layer 4 of the electrochemical element 1 produced in the above-described step. The counter electrode layer forming step can be performed by using a low-temperature sintering method (e.g., wet method using sintering in a low-temperature range without performing sintering in a high-temperature range at 1400° C., etc.), an aerosol deposition method, a flame gunning method (a thermal spraying method), or the like, using a powder of a material (a complex oxide such as LSCF or LSM) for forming the counter electrode layer 5 functioning as a counter electrode of the electrode layer 3.

Example 1

Figure 3A:
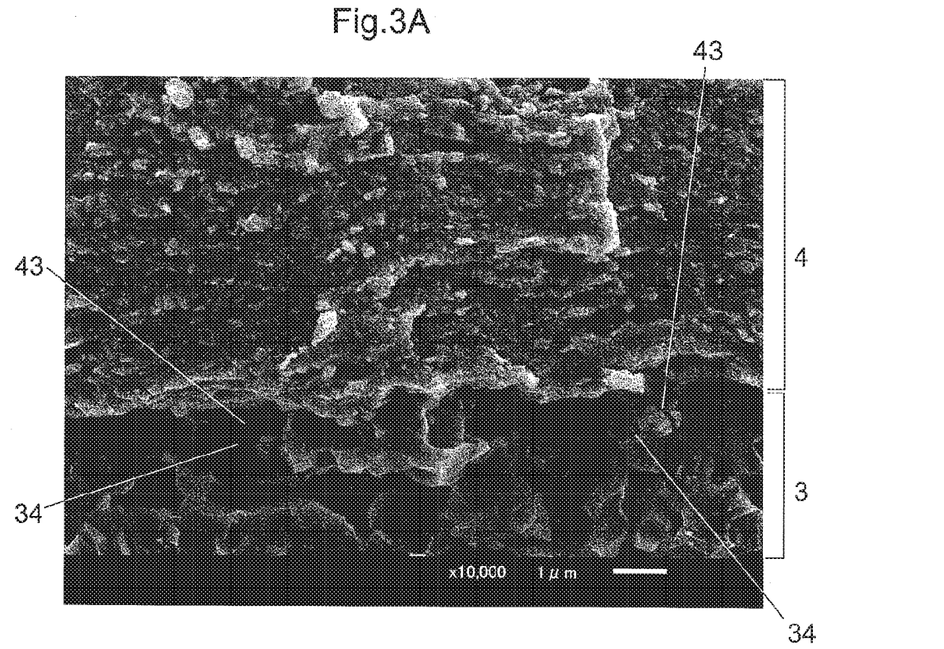
FIG. 3A and FIG. 3B shows electron micrographs of cross-sections of an electrochemical element according to Example 1.
Figure 3B:
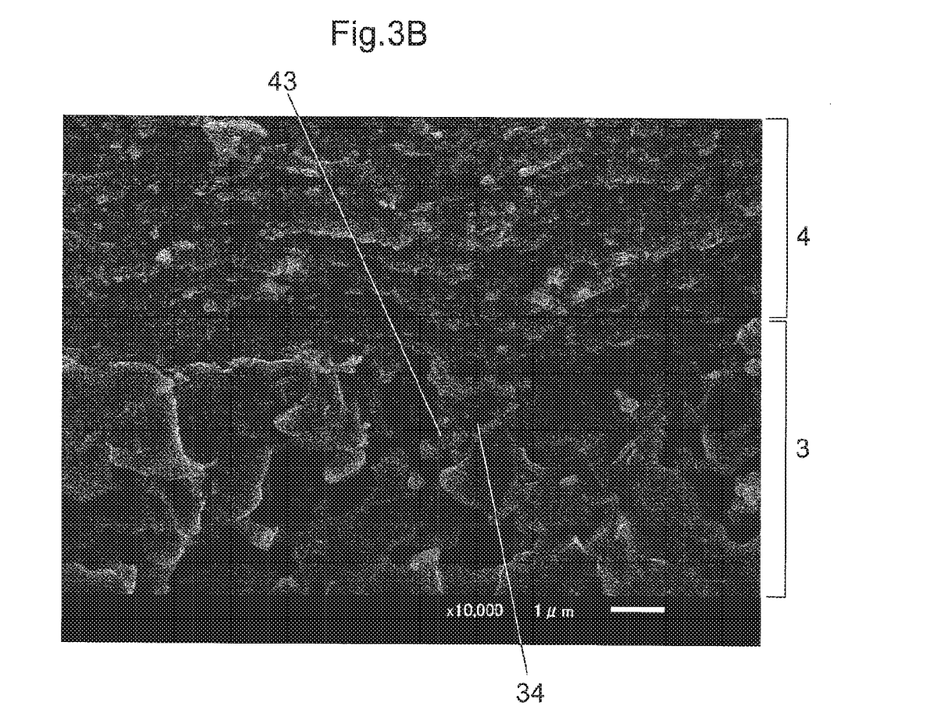

The electrode layer 3 was formed as follows. First, 50% by weight of NiO powder and 50% by weight of 8YSZ powder were mixed, an organic binder was added thereto, and the mixture was kneaded with water to obtain a clay-like substance. Subsequently, the clay-like substance was extrusion-molded to obtain a flat plate-like molded article. Then, 60% by weight of NiO powder and 40% by weight of GDC powder were mixed, and an organic binder and an organic solvent (dispersion medium) was added to obtain a coating slurry, and the obtained flat plate-like molded article was dip coated by immersing in the coating slurry. After the dip coating, the flat plate-like molded article was dried, and fired at 1300° C. for 2 hours, to obtain an electrode layer 3.

Subsequently, an 8YSZ (yttria-stabilized zirconia) powder having a mode diameter of about 0.7 μm was aerosolized in dry air at a flow rate of 6 L/min. The aerosol was introduced into a chamber at a pressure of 190 Pa, and an electrolyte layer 4 was formed using an aerosol deposition method by spraying this aerosol over a range of 10 mm×15 mm onto the electrode layer 3 without heating, and thus an electrochemical element 1 was obtained.

FIG. 3A and FIG. 3B shows electron microscope images (SEM images) of cross-sections of the thus obtained electrochemical element 1. It is seen from FIG. 3 that the plurality of pores 34 that were open on a face, of the electrode layer 3, in contact with the electrolyte layer 4 were filled with the fine particles 43 made of the same components as the electrolyte layer 4, that is, the dense electrolyte layer 4 was obtained on the porous and gas-permeable electrode layer 3 without performing heating.

Example 2

Figure 4:
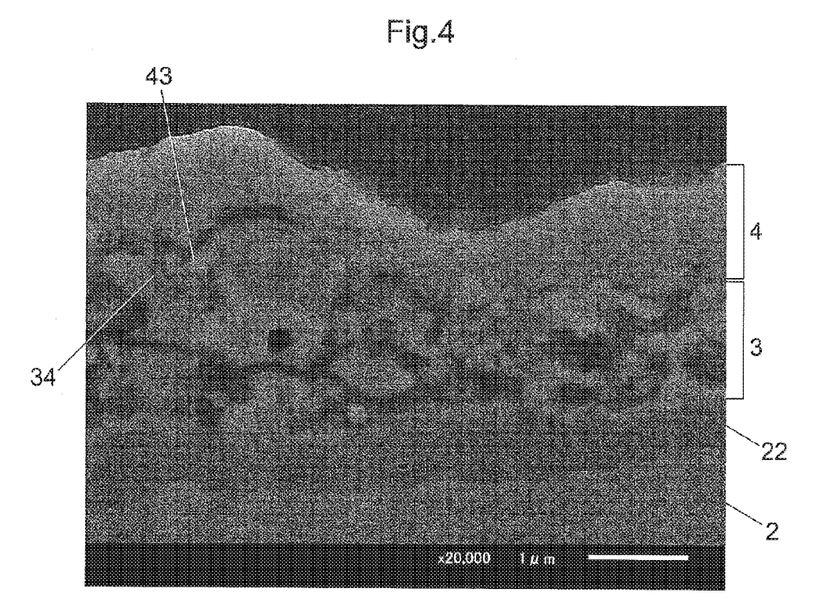
FIG. 4 shows an electron micrograph of a cross-section of an electrochemical element according to Example 2.

A plurality of through holes 21 were formed by performing laser processing in a region within a 2.5 mm radius from the center of a circular crofer 22 APU plate having a thickness of 0.3 mm and a diameter of 25 mm, and thus a metal substrate 2 was obtained. At this time, the through holes were formed by performing laser processing such that the through holes each had a diameter of approximately 10 to 15 μm on the surface of the metal substrate 2.

Next, 60% by weight of NiO powder and 40% by weight of GDC powder were mixed, and an organic binder and an organic solvent were added thereto, to obtain a paste, which was then added dropwise to the region in which the through holes of the metal substrate 2 were formed (preliminary applying step). Then, the paste on the surface of the metal substrate 2 was wiped and rubbed into the through holes (pushing and wiping step).

Next, 60% by weight of NiO powder and 40% by weight of GDC powder were mixed, and an organic binder and an organic solvent were added thereto, to obtain a paste, which was then applied to form an electrode layer 3 by using a spray blowing method in a region within a 3.5 mm radius from the center of the metal substrate 2. Subsequently, degreasing treatment was performed in air at 450° C. (main applying step).

Next, the metal substrate 2 onto which the electrode layer 3 was applied was fired for 30 minutes in an $H_2/H_2O/N_2$ mixture gas atmosphere adjusted to an oxygen partial pressure of $4.1 \times 10^{-17}$ atm at 1050° C. Subsequently, the metal substrate 2 was fired for another 15 minutes in an $O_2/H_2O/N_2$ mixture gas atmosphere adjusted to $pO_2=2.0 \times 10^{-2}$ atm at 1050° C. (sintering step).

Subsequently, an 8YSZ (yttria-stabilized zirconia) powder having a mode diameter of approximately 0.7 μm was aerosolized in dry air at a flow rate of 6 L/min. The aerosol was introduced into a chamber at a pressure of 190 Pa, and an electrolyte layer 4 was formed by spraying this aerosol over a range of 10 mm×15 mm onto the metal substrate 2 on which the electrode layer 3 was arranged, so as to cover the electrode layer, without heating, and thus an electrochemical element 1 was obtained.

FIG. 4 shows an electron microscope image (SEM image) of a cross-section of the thus obtained electrochemical element 1. It is seen from FIG. 4 that the plurality of pores 34 that were open on a face, of the electrode layer 3, in contact with the electrolyte layer 4 were filled with the fine particles 43 made of the same components as the electrolyte layer, that is, the dense electrolyte layer 4 was obtained on the porous and gas-permeable electrode layer 3 without performing heating. Furthermore, it is seen that the thickness of the metal oxide film 22 was approximately 0.4 μm to 0.6 μm.

Furthermore, measurements showed that the hydrogen gas permeability (hydrogen leakage amount) of the obtained electrochemical element 1 was lower than the detection limit ($4.9 \times 10^{-9}$ mol/m$^2$sPa or less).

Reference Example 1

The metal substrate 2 on which the electrode layer 3 was arranged was produced likewise to Example 2 above, except that the electrolyte layer 4 was not formed. Measurements showed that the hydrogen gas permeability (hydrogen leakage amount) of the obtained electrochemical element 1 was $1.1 \times 10^2$ mol/m$^2$sPa.

It is seen from the results in Example 2 and Reference Example 1 above that the electrode layer 3 was gas-permeable (hydrogen-permeable) and the electrolyte layer 4 was dense and had sufficient gastightness.

Second Embodiment

Although the electrochemical element 1 was used in the solid oxide fuel cell stack 100 in the foregoing embodiment, the electrochemical element 1 can be used in solid oxide electrolysis cells, oxygen sensors that use solid oxides, and the like.

Third Embodiment

Although the solid oxide fuel cell stack 100 in which an anode electrode was formed as the electrode layer 3 and a cathode electrode was formed as the counter electrode layer 5 was used in the foregoing embodiment, a configuration can also be used in which a cathode electrode is formed as the electrode layer 3 and an anode electrode is formed as the counter electrode layer 5.

The configurations disclosed in the foregoing embodiments can be used in combination with configurations disclosed in other embodiments, as long as there are no contradictions. The embodiments disclosed in this specification are, in all respects, illustrative and not limiting. Various modifications may be made without departing from the gist of the invention.

INDUSTRIAL APPLICABILITY

Application to an electrochemical element and a solid oxide fuel cell having excellent durability is possible.

DESCRIPTION OF REFERENCE SIGNS

1: Electrochemical element
2: Metal substrate
21: Through hole
22: Metal oxide film
3: Electrode layer
31: Second layer (upper part)
32: First layer (lower part)
33: Insertion portion
34: Pore
35: Opening
4: Electrolyte layer
41: First portion
42: Second portion
43: Fine particle
5: Counter electrode layer
100: Solid oxide fuel cell stack

The invention claimed is:

1. An electrochemical element comprising:
an electrode layer; and
an electrolyte layer arranged on the electrode layer,
wherein the electrode layer has a plurality of pores that are open on a face thereof in contact with the electrolyte layer, and
the pores are filled with fine particles made of the same components as the electrolyte layer,
a relative density of the fine particles filled into the pores of the electrode layer is lower than a relative density of the electrolyte layer.

2. The electrochemical element according to claim 1, wherein the pores include pores whose openings each have a diameter of 0.1 µm or more and 5 µm or less.

3. The electrochemical element according to claim 1, wherein the fine particles include fine particles each having a diameter that is 0.05 µm or more and 0.8 µm or less and is smaller than that of the openings of the pores.

4. The electrochemical element according to claim 1, wherein the electrolyte layer contains a zirconia-based ceramic.

5. The electrochemical element according to claim 1, wherein the electrode layer is made of cermet.

6. The electrochemical element according to claim 1, wherein part of the electrolyte layer includes a dense electrolyte layer having a relative density of 90% or more.

7. The electrochemical element according to claim 1, wherein crystal grains in the electrolyte layer include crystal grains each having a grain size of 0.5 µm or less.

8. The electrochemical element according to claim 1, wherein the electrode layer is provided on a front face of a metal substrate, and a plurality of through holes passing through the front face and a back face of the metal substrate are provided inside a region, of the metal substrate, in which the electrode layer is provided, and
the electrolyte layer has a first portion coating the electrode layer, and a second portion that is in contact with the front face of the metal substrate.

9. The electrochemical element according to claim 8, wherein the metal substrate is made of a ferrite-based stainless steel.

10. A solid oxide fuel cell in which a counter electrode layer functioning as a counter electrode of the electrode layer is provided on the electrolyte layer of the electrochemical element according to claim 1.

11. A method for producing an electrochemical element according to claim 1, comprising:
an electrolyte layer forming step of forming the electrolyte layer on the electrode layer by using an aerosol deposition method,
wherein, in the electrolyte layer forming step, the pores are filled with fine particles made of the same components as the electrolyte layer.

12. The method for producing an electrochemical element according to claim 11, comprising:
an electrode layer forming step of forming the electrode layer on a front face of the metal substrate.

13. The method for producing an electrochemical element according to claim 11, wherein a temperature in heat treatment performed in the electrode layer forming step and the electrolyte layer forming step is 1100° C. or lower.

14. The method for producing an electrochemical element according to claim 12, wherein, in the electrolyte layer forming step, an electrolyte layer having a first portion coating the electrode layer, and a second portion that is in contact with a front face of a metal substrate is formed by spraying an aerosolized raw material powder onto an area extending over the electrode layer and the front face of the metal substrate.

15. A method for producing a solid oxide fuel cell, comprising: a counter electrode layer forming step of, after the method for producing an electrochemical element according to claim 11 is performed, forming a counter electrode layer functioning as a counter electrode of the electrode layer, on the electrolyte layer.

* * * * *